Figure 1:
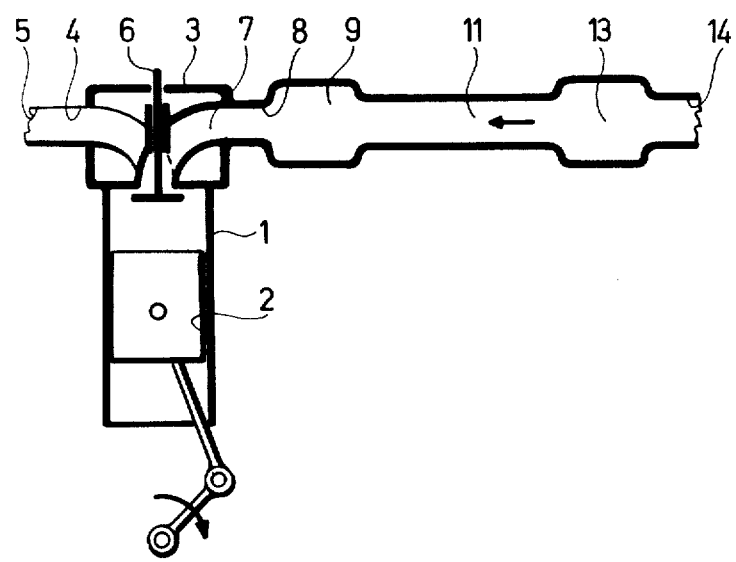

United States Patent
Annus et al.

[11] 3,796,048
[45] Mar. 12, 1974

[54] TURBOCHARGED INTERNAL COMBUSTION ENGINE WITH RESONANCE INDUCTION PIPE SYSTEM

[75] Inventors: Imre Annus; Gyula Cser; Sandor Florian; Gyorgy Horvath; Ferenc Kocsis, all of Budapest, Hungary

[73] Assignees: Autoipari Kutato Intezet, Budapest; Csepel Autogyar, Szigethalom, both of, Hungary; part interest to each

[22] Filed: Sept. 27, 1972

[21] Appl. No.: 292,532

[30] Foreign Application Priority Data
Sept. 28, 1971 Austria .............................. 8374/71

[52] U.S. Cl. .......................... 60/598, 123/52 M
[51] Int. Cl. .......................................... F02b 37/04
[58] Field of Search ...................... 123/52 M; 60/13

[56] References Cited
UNITED STATES PATENTS

| | | | |
|---|---|---|---|
| 2,581,668 | 1/1952 | Kadenacy | 60/13 |
| 3,298,332 | 1/1967 | Elsbett | 123/52 M |
| 2,740,389 | 4/1956 | Reyl | 123/52 M |
| 3,146,764 | 9/1964 | Elsbett | 123/52 M |
| 3,396,532 | 8/1968 | Munk | 123/52 M |
| 2,088,983 | 8/1937 | Swennes | 123/52 M |

Primary Examiner—Carlton R. Croyle
Assistant Examiner—Warren Olsen
Attorney, Agent, or Firm—Young & Thompson

[57] ABSTRACT

The invention concerns a supercharged internal combustion multi-cylinder engine, an exhaust-turbo supercharger driven by exhaust gases from the cylinders which are divided into groups so that the suction strokes of the cylinders within a given group do not overlap, and a resonance induction pipe system connecting the inlet means in each cylinder to the delivery side of the supercharger so as to create conditions of dynamic charging in the induction pipe system to supplement the action of the supercharger.

4 Claims, 2 Drawing Figures

TURBOCHARGED INTERNAL COMBUSTION ENGINE WITH RESONANCE INDUCTION PIPE SYSTEM

This invention concerns an internal combustion engine with exhaust-turbo supercharing wherein the exhaust-turbo supercharging is complemented by dynamic supercharging (as defined hereinafter).

Although the invention is not intended to be so limited, it will hereinafter be described with reference to reciprocating piston engines.

The useful output of an internal-combustion engine greatly depends on the mass of air ingested by the engine for combustion. However, the amount of air or fuel-air mixture sucked in by intermittently operating piston engines is inherently limited. The limit stems from the flow resistance which arises during the induction effect. The charging of the cylinder can be improved with various known devices and processes. With these devices and processes an air mass can be introduced into the cylinder which is greater even than is the case for ideal cylinder operation without flow losses.

One such charging method is by exploitation of the periodic induction effect of the piston. That is to say, an unstable gas flow or oscillation arises in the induction pipe system during the ingestion, and the oscillation energy is then used up in the charging of the cylinder. In the art this method is known as "dynamic supercharging," and throughout this specification this expression is intended to have the meaning as defined in the foregoing.

The air or fuel-air mixture sucked in by the engine can be increased to a greater extent than by dynamic supercharging as defined above if the engine is arranged not to suck in the air directly from the ambient atmosphere but instead the cylinder charging proceeds via a special device, the so-called supercharger. As is known, the latter is generally a compressor operating mechanically or by another system which compresses the ambient air and passes it into the cylinder of the engine. Internal-combustion engines provided with such an auxiliary device, i.e. the supercharger (booster) are referred to as supercharged engines.

The output required for driving the supercharger must be provided by the engine, and for this reason in recent years and mainly for economy reasons, superchargers which are actuated by engine exhaust gas-driven gas turbines, the so-called turbo-chargers, or according to the older designation turbo-superchargers, have come more and more into the foreground.

Such apparatus takes the significant amount of driving power required not from the useful output available at the crankshaft, but from the otherwise mainly wasted exhaust gases of the engine. As is known, the turbochargers comprise constructionally two main parts of which one is the gas turbine driven by the exhaust gases of the engine, while the other is a compressor which is arranged on the same shaft as the gas turbine and which produces the actual demand of air or fuel-air mixture. In accordance with the size of the engine, the number of its cylinders, its purpose, and in dependence upon other factors, the individual internal-combustion engines with turbo-supercharging can be provided with one or more turbo-superchargers.

In internal-combustion engines with turbo-supercharging the compressor of the supercharger ingests air from the ambient atmosphere, possibly through an air filter, and delivers it under high pressure, possibly already mixed together with fuel, through the inlet system (suction pipe) of the engine and the inlet valve or inlet port into the engine cylinder. The amount of air or fuel-air mixture delivered during the suction stroke to the engine cylinders depends, in addition to the dimensions and characteristic values of the engine, primarily on the dimensions and construction of the turbo-charger and on the energy of exhaust gases driving the turbine of the turbocharger. For these reasons the internal-combustion engine must be carefully harmonised with the turbocharger so that the increased air or fuel-air mixture delivery to the engine corresponds to the operational conditions of the engine. The mutual harmonisation of the engine and the turbocharger is in certain cases, e.g. in stationary or ship operations, wherein the engine runs for a long time with a constant load and r.p.m., a relatively simple and well-solvable task.

A considerably less favourable example of use of engines with turbochargers is for road vehicles. In the latter case the load and r.p.m. vary between quite wide limits to which should be added the frequency very quick changes of load and r.p.m. arising in operation of the road vehicle. Since the internal-combustion piston engine and the turbocharger are two machines operating on completely different principles — one is a volumetric machine operating on the displacement principle, the other is a rotary machine operating on the turbine principle — the engine and the turbocharger could not hitherto be co-ordinated really favourably as regards the several simultaneous and considerably different operational conditions and their rapid changes.

The general characteristic of this phenomenon lies in that the turbocharger produces an ever greater supercharging with increasing engine r.p.m. and is not fitted to satisfy the stipulated demand of a flexible torque output achievable by the engine. In this way, e.g. a turbocharger which charges the internal-combustion engine satisfactorily in the region of its design r.p.m., (i.e. its maximum operational r.p.m.), cannot operate adequately at the r.p.m. corresponding to or below maximum engine torque, as is known in the art, so that an inflexible, low torque engine with unfavourable dynamics results. If, in contrast, the turbocharger is so designed that even by the last mentioned low engine r.p.m. it provides the corresponding degree of supercharging, then at maximum operational r.p.m. of the engine excessive loads appear which are harmful as much for the engine as for the turbo-charger and may possibly destroy one or both of them.

In the hitherto known turbo-supercharging processes internal-combustion engines, primarily diesel engines with turbo-supercharging, exhibit further disadvantageous properties. In these engines the fuel is delivered into the cylinders of the engine by a metering or injection pump which is controlled by the driver through a foot pedal or a hand lever. In the case of a sudden load change — mainly when accelerating — the amount of fuel injected into the motor is increased suddenly whereby the turbocharger driven by exhaust gases begins the delivery of the greater air mass required for the combustion of the excess fuel only considerably later owing to its inertia. Consequently, in known supercharged engines in the event of a sudden acceleration or gear change the fuel always burns in insufficient air which, in addition to harmfully stressing the engine and wasting fuel; also has the consequence of increased smoke emission which is harmful to health and dangerous to the surrounding traffic. Although in practice one has strived to reduce the above-mentioned disadvantages by various devices, regulating valves etc., until now no solution was known which could completely remedy or significantly reduce these drawbacks.

For instance, a turbo-supercharging process is known wherein the maximum amount of fuel delivered by the injection pump of the engine is limited by a special device in dependence on the magnitude of pressure built up in the induction pipe of the engine behind the turbocharger. In all cases — e.g. sudden acceleration or addition of gas or low engine r.p.m. — if the turbocharger delivers relatively little air and there is insufficient pressure in the induction pipe, the device restricts the amount of fuel injectable into the engine. This solution obviates the already mentioned harmful smoke emission as well as the overloading of the engine, but the dynamics of the engine are thereby considerably impaired, since the latter in each transitional operating condition runs under partial load only and correspondingly can deliver only a part of its design torque.

As a further example, the known turbo-supercharging process may be mentioned wherein the exhaust gases are released from the exhaust pipe upstream of the turbo-charger with the aid of relief control valves whereby it is intended to reduce the too-sudden pressure increase occurring at high engine r.p.m. In this case only a part of the exhaust gases keeps the driving turbine rotor of the turbocharger in rotation and moreover, evidently, with a considerably lower r.p.m. With a lower r.p.m. the turbo-charger delivers less air and consequently the charging pressure also drops. In this process the favourable operation of the turbocharger can be harmonised with low engine r.p.m. and the excessively high increase of super-charging pressure arising at higher engine revolution can be avoided by actuating the control valve. Although theoretically this system has undoubted advantages, it has not proved itself in practice because a defect occurring in the control valve, which is built into the exhaust pipe and subjected to extraordinarily high heat stresses, has the consequence of a sudden increase of the supercharging pressure and thus a break-down of the engine.

One could also enumerate further examples — e.g. the process which proposes the serial coupling of two or more turbochargers etc. — but an examination of the processes described in detail hitherto confirms that elimination of the drawbacks existing in known turbocharging has been attempted in practice by various turbo-supercharging processes, yet until now no really favourable solution could be found which would satisfy all practical demands.

The aim of the invention is therefore the elimination of the mentioned drawbacks which have until now appeared in the mode of operating engines with turbocharging by increasing the efficiency of the turbo-supercharging, whereby the extent of charging the cylinder is significantly enhanced and the output and flexibility of the engine torque is also improved, further wherein the smoke emission occurring on acceleration is reduced to a minimum and a hitherto completely known turbocharging process can be achieved such that the r.p.m. range of maximum engine torque is significantly widened without increasing the load value or the design r.p.m. of the engine.

Thus the invention concerns internal combustion piston engines with exhaust turbo-supercharging wherein the exhaust turbo-supercharging is supplemented by dynamic supercharging which occurs in the induction system formed between the cylinders and the exhaust-turbocharger(s) as a consequence of the gas oscillations arising from the periodic suction action of the pistons.

Accordingly, the present invention consists in a supercharged internal-combustion engine comprising a plurality of working chambers divided into at least two groups of at least one working chamber and at most four working chambers per group, at least one exhaust-turbo supercharger connected to receive and be driven in use by the exhaust gases from said working chambers, means for controlling the operating sequence of the said chambers so that the suction strokes of the said chambers within a multi-chamber group take place without substantial overlap, inlet means in each said chamber, and a resonance induction pipe system connecting the said inlet means to the delivery side of the said supercharger(s) so as to receive compressed air therefrom and to create conditions of dynamic charging (as herein defined) in said system.

Preferably, the said pipe system is constituted by a resonance vessel connected to the said inlet means of a group, and a resonance pipe connected between the associated resonance vessel and the delivery side of the, or the associated, supercharger.

The inlet means may be connected to the associated resonance vessel via an induction pipe whose length in metres does not exceed $L = 1,500/n$ where "$n$" is the rated r.p.m. of the engine.

The greatest dynamic supercharging effect can be achieved according to a preferred embodiment of the invention when the capacity of each resonance vessel is arranged to be greater than one-half the capacity of the cylinder connected to the resonance vessel, but is smaller than 10 times that capacity, and the length of the central line of the resonance pipe is preferably greater than eight times the inner diameter of the pipe, wherein by "inner diameter"for non-circular section pipes the diameter of the circle giving the same cross-section is to be understood.

In internal combustion engines with the supercharging process taking place according to the invention a considerable mass of air or fuel-air mixture is stored up in the induction pipe system connecting the engine cylinders with the turbocharger. In this case each engine piston accelerates the mass of air or fuel-air mixture located at the beginning of the suction period in the resonance pipe of the induction pipe system and thus causes a significant increase in kinetic energy (K.E.). This periodical increase in K.E. causes oscillations in the very high inertia mass of air or fuel-air mixture present in the induction pipe system, as a result of which a high overpressure is built up in the second half of the suction stroke in the resonance volume before in the inlet valve or port of the cylinder which is in the process of suction. Because of the overpressure the fresh air or fuel-air mixture is pressed into a given cylinder in an increased mass. This has the consequence that the degree of charging (the supercharging efficiency) increases by 10–30 percent in comparison with the hitherto known supercharged engines without enhanced stress of the turbocharger under the effect of the momentary overpressure due to the oscillations.

In supercharged engines used for road vehicles it is expedient so to choose the engine r.p.m. range guaranteeing the greatest dynamic supercharging effect that the former lies near the maximum engine torque or somewhat below it. In this case, the supercharging efficiency of an engine operating according to the process of the invention suddenly improves precisely in that r.p.m. range in which known turbochargers were rather inefficient. Because of the increase in cylinder charging the maximum engine torque rises and the associated r.p.m. is lowered. Also a decrease in specific fuel consumption, in the temperature of the exhaust gases and in smoke emission can be ascertained. As has been proved from numerous practical measurements, such an improvement in the engine parameters occurs in general in the lower half of the engine operational r.p.m. range. Bearing in mind the fact that the improvement of the charging efficiency achievable by the process according to the invention is nearly independent of the operation of the turbocharger for a given induction pipe system, the improvement appears as much in the case of sudden acceleration and r.p.m. change as in the case of stationary operation of a supercharged engine. The process according to the invention thus exhibits a particularly favourable efficiency under the rapidly changing requirements of road traffic.

The process according to the invention can naturally also be exploited for increasing the rated (maximum) output of an engine with turbo-supercharging primarily for ship propulsion and stationary installations. In this case it is expedient so to choose the engine r.p.m. range guaranteeing the favourable efficiency that this range lies near the rated engine r.p.m. Numerous practical measurements have ascertained that in such cases the rated engine output can in given cases be increased by 10–30 percent without any special stressing of the turbocharger, and moreover with a simultaneous reduction in the supercharging pressure.

A further characteristic of the process according to the invention, whereby it is sharply differentiated from the hitherto known supercharging processes, is that the air intake of an engine operating according to this process reaches a maximum value permitted by the given system not only at a given r.p.m. but also in a very wide r.p.m. range. The dynamic supercharging (supercharging efficiency) produced in the usual and known way increases most at a given engine r.p.m. because of the oscillations in the engine air consumption occurring in the induction pipe. This r.p.m. is dependent, in addition to the construction and relative dimensions of the induction pipe system, also on the speed of sound prevailing in the medium streaming through the induction pipe. Thus it is known that in a compressible medium every disturbance or change is propagated therein at the prevailing speed of sound. Consequently the oscillation conditions of a compressible medium in a given induction pipe system change proportionally to the speed of sound, as does the natural frequency of the system.

In a suction duct formed from the inlet channel associated with the engine cylinder and the suction pipe coupled thereto and where the suction pipe belonging to the given inlet channel sucks directly from the ambient atmosphere, the natural frequency of the streaming medium is given by $$\gamma = a/4L \ (Hz),$$

where "a" ($m/sec$) is the velocity of sound prevailing in the medium and $L$ ($m$) is the length in metres of the suction duct between the cylinder and the ambient atmosphere.

Our experiments have also ascertained that the air consumption (intake) of a dynamically supercharged engine provided with such a suction duct is at a maximum when the engine r.p.m. and the natural frequency of the medium streaming in the suction pipe are in a definite mutual relation. At different r.p.m.'s the air intake is reduced. This is the reason why in dynamic supercharging processes known in the art a certain engine r.p.m. is found at which, whatever the engine load, the quantity of fresh charge ingested into the cylinder is at its greatest.

In hitherto known turbo-supercharging processes the engine r.p.m.'s at which the supercharged engine consumed the fresh air could also be determined accurately. These strictly coincided with the r.p.m. of the rated engine output, following from the known properties of turbochargers.

The situation is quite different in the turbo-supercharging process according to the invention. On part-load of the engine, when a relatively small quantity of fuel is burnt, the temperature of the exhaust gases and its volume ratio remain low. This has the consequence that relatively little energy is utilised in the turbocharger and so its turbine rotor rotates relatively slowly. Naturally also relatively little air is delivered to the engine. The direct result is that the pressure and temperature of the medium streaming in the induction pipe system of the engine remain relatively low. It is generally known that the velocity of sound prevailing in a compressible medium is proportional to the square root of the absolute temperature. In this way in all the cases where the turbocharger delivers relatively little air, the speed of sound also stays relatively low and when the quantity of medium delivered by the turbocharger increases, the temperature, and thus the velocity of sound, also increase.

From what has been said, another advantageous property results from the process according to the invention. At low r.p.m. or when the engine runs at partial load, and when the turbocharger itself runs at a relatively low r.p.m., maximum efficiency of dynamic supercharging occurs because of the low velocity of sound. As soon as the driver actuates the fuel supply to pass more fuel and the turbo-charger as well as the engine begins to run faster, the r.p.m. as well as the velocity of sound at which the dynamic supercharging deliver their greatest effect, rise together.

In other words, in the supercharging process according to the invention the maximum value of the charging ensured by the dynamic supercharging follows the running of the engine in an extraordinarily wide engine r.p.m. range. This has the consequence that effective supercharging can be realised in a considerably greater engine r.p.m. range than could even be hoped for in hitherto known supercharging processes. A natural corollary of the foregoing is that the improvement in engine parameters already mentioned earlier occurs in a surprisingly large r.p.m. range, as has been ascertained on the basis of numerous practical measurements.

Figure 2:
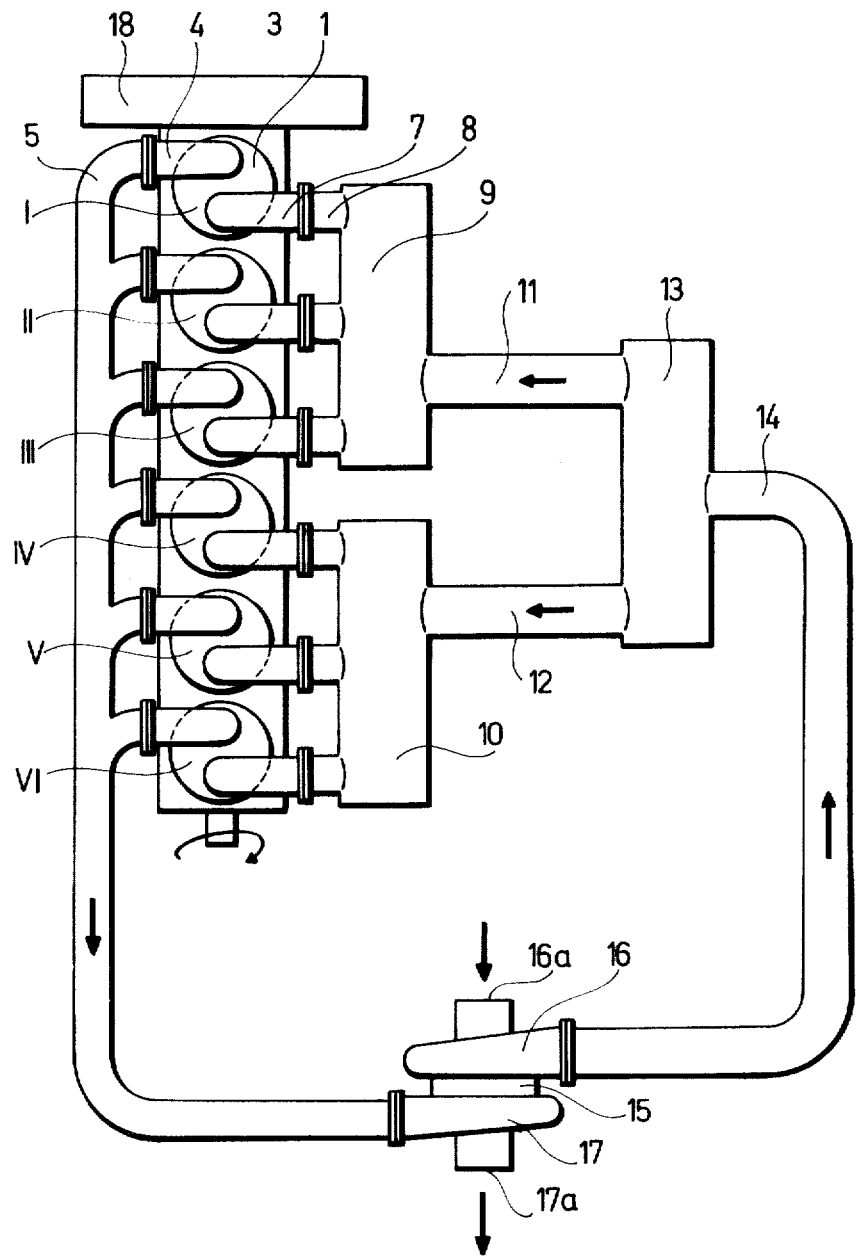

The invention is described, by way of example only, with reference to the accompanying, purely diagrammatic drawings, wherein:

FIG. 1 is a section of a six-cylinder diesel engine and its induction pipe system containing a resonator vessel and also a resonator pipe; and FIG. 2 represents the same in plan.

Each cylinder 1 of the six-cylinder diesel engine shown in FIGS. 1 and 2 and operating with an induction pipe system has a piston 2 reciprocating therein. In the cylinder head 3 an outlet duct 4 is arranged to which the exhaust pipe 5 is connected.

An inlet valve 6 is in connection with an inlet duct (suction duct) 7, to which a suction pipe 8 is coupled, and also arranged in the cylinder head 3. The engine of the example shown accordingly possesses an inlet and an outlet valve for each cylinder. If one provides the six cylinders of the engine with a running numbering beginning from the flywheel 18, an ignition timing sequence, and accordingly also an induction sequence, of the cylinders I-V-III-VI-II-IV results.

Stemming from the usual mode of operation of the engine, the cylinders I, III and II and the cylinders V, VI and IV follow each other in operation at a crankshaft rotation angle of 240°. This angle is practically the same as the angle of opening of the inlet valves associated with the individual cylinders. This is why the suction strokes of the individual cylinders of the cylinder groups comprising, respectively, the cylinders I, II and III and IV, V and VI, are arranged sequentially, i.e. their suction strokes either do not overlap at all or only scarcely so. Accordingly, the suction pipes 8 of cylinders I, II and III, which do not significantly overlap during the suction stroke, debouch into a common resonance vessel, the resonance vessel 9. Similarly, the suction pipes 8 associated with the cylinders IV, V and VI are connected to a common resonance vessel 10. A respective resonance duct 11, 12 is coupled to the resonance vessel 9, 10 and the ducts 11, 12 connect into a common manifold 13. The manifold 13 is connected with a turbocharger 15 of the engine, or more precisely with the compressor 16 of the turbocharger 15, via a connecting pipe 14. A turbine 17 is arranged on the same shaft as the compressor 16 of the turbocharger 15 and to which the exhaust pipe 5 is connected.

The exhaust gases reach the exhaust pipe 5 by streaming through, and thus setting in rotation, the rotor of the turbine 17. The exhaust gases streaming through the turbine arrive into the free atmosphere through an opening 17a or through an exhaust duct not shown in the drawings.

The compressor 16 of the turbocharger sucks air directly from the atmosphere, via intake 16a, or via a non-illustrated air filter, and compresses it into the connecting pipe 14. The air streams out of the pipe 14 into the manifold 13 where it is divided into two and flows into the cylinders via the resonance ducts 11 and 12, the resonance vessels 9 and 10 and then the induction pipes 8. Under the effect of the periodic suction by the cylinder periodic pressure changes occur in the resonance vessels 9 and 10 which excite the air columns flowing partly into the resonance pipe 11 and partly into the resonance pipe 12 into oscillation. As soon as the natural frequency of the system and the frequency of the excited pressure changes reach a corresponding relation, the air present in the induction pipe system comes into an intensive oscillation condition and this ensures the dynamic supercharging effect embodied in the process of this invention.

At a low r.p.m., depending on the type of engine and the adjustment of the turbocharger, where the air delivery effect of the turbocharger is no longer adequate, a resonance occurs which agress with the suction period. Through this resonance relation the gas present in the induction pipe system comes into oscillation. This oscillation energy ensures a dynamic supercharing at low engine r.p.m. Should the engine r.p.m. rise to the rated r.p.m., the intensity fof the gas oscillations fails. At the rated r.p.m. of the engine the supercharging is effected only through the turbo-supercharger.

In dependence on the engine dimensions, with the aid of the apparatus, the supercharging efficiency (charging) of the cylinders very significantly increases, viz. by about 20-30 percent in an r.p.m. range of 200 to 500, or still wider. In this way the apparatus is favourably suited to increase the maximum torque of turbo-supercharged engines, and further to improve the conditions arising at low engine r.p.m.

It was ascertained through many measurements that the peak values of combustion in the vicinity of the rated r.p.m. are smaller than the same with a cylinder charged by a turbocharger. The reduction may attain even 10-20 percent. This unexpected effect ensures that the construction according to the invention protects the engine. This effect originates in that induction pipe system ensuring the dynamic boosting "ingests" from the turbocharger. Because of this ingestion the back pressure of the space behind the turbocharger as well as the pressure conditions of the turbocharger and temperature of the supercharging air are reduced. The lower temperature and thus higher density air thus charges the engine cylinder. The compression thus starts at lower temperature and pressure conditions and this is why the peak combustion values are also lower. The result is a lower mechanical and thermal stress on the engine.

As further advantages of the apparatus, one can mention its favourably producible construction and its relatively low space requirements.

We claim as our invention:

1. A supercharged internal combustion engine comprising a plurality of working chambers having at least one group of at least one working chamber and at most four working chambers per group, at least one exhaust-turbo super-charger connected to receive and be driven in use by the exhaust gases from said working chambers, means for controlling the operating sequence of the said chambers to time the suction strokes to the said chambers within a multichamber group to take place without substantical overlap, inlet means in each said chamber, and a resonance induction pipe system connecting the said inlet means to the delivery side of said supercharger, said pipe system comprising a receiver between said supercharger and said inlet means, a resonance vessel between said receiver and said inlet means, and a resonance pipe between said vessel and said receiver.

2. An engine as claimed in claim 1, and a pipe between said inlet means and said vessel, said pipe having a length in meters no greater than 1,500 divided by the rated r.p.m. of the engine.

3. An engine as claimed in claim 2, the capacity of said vessel being greater than one-half but less than 10 times the capacity of a said working chamber and the length of said resonance pipe being greater than 8 times the diameter of a circle having the same cross sectional area as the interior of said resonance pipe between said vessel and said receiver.

4. An engine as claimed in claim 1, said groups being at least two in number, there being a said vessel individual to each said group, said receiver being common to all said groups.

* * * * *

Disclaimer 3,796,048.—*Imre Annus, Gyula Cser, Sandor Florian, Gyorgy Horvath & Ferenc Kocsis*, Budapest, Hungary. TURBOCHARGED INTERNAL COMBUSTION ENGINE WITH RESONANCE INDUCTION PIPE SYSTEM. Patent dated Mar. 12, 1974. Disclaimer filed July 20, 1982, by the assignee, *Autoipari Kutato Intezet and Csepel Autogyar.*

Hereby enters this disclaimer to claims 1 and 4 of said patent.
[*Official Gazette August 24, 1982.*]

UNITED STATES PATENT AND TRADEMARK OFFICE
CERTIFICATE OF CORRECTION

PATENT NO. : B1 3,796,048
DATED : May 31, 1983
INVENTOR(S) : Imre Annus et al

It is certified that error appears in the above-identified patent and that said Letters Patent is hereby corrected as shown below:

Column 1, line 22, after "claim" insert --5,--.

Signed and Sealed this

Fourth Day of September 1984

[SEAL]

Attest:

GERALD J. MOSSINGHOFF

Attesting Officer     Commissioner of Patents and Trademarks

REEXAMINATION CERTIFICATE (88th)

United States Patent [19]
Annus et al.

[11] B1 3,796,048
[45] Certificate Issued May 31, 1983

[54] TURBOCHARGED INTERNAL COMBUSTION ENGINE WITH RESONANCE INDUCTION PIPE SYSTEM

[75] Inventors: Imre Annus; Gyula Cser; Sandor Florian; Gyorgy Horvath; Ferenc Kocsis, all of Budapest, Hungary

[73] Assignees: Autoipari Kutato Intezet, Budapest; Csepel Autogyar, Szigethalom, both of Hungary; part interest to each

Reexamination Request
No. 90/000,223, Jun. 30, 1982

Reexamination Certificate for:
Patent No.: 3,796,048
Issued: Mar. 12, 1974
Appl. No.: 292,532
Filed: Sep. 27, 1972

Disclaimer of claims 1 and 4, filed Jun. 30, 1982 (824 O.G. 82).

[30] Foreign Application Priority Data
Sep. 28, 1971  Austria ........................ 8374/71

[51] Int. Cl.³ .................... F02B37/04; F02B27/00
[52] U.S. Cl. ............................ 60/605; 123/52 M
[58] Field of Search ............ 60/605, 598; 123/52 M

[56] References Cited

FOREIGN PATENT DOCUMENTS
1935155  2/1970  Fed. Rep. of Germany.

*Primary Examiner*—M. Koczo, Jr.

[57] ABSTRACT

The invention concerns a supercharged internal combustion multi-cylinder engine, an exhaust-turbo supercharger driven by exhaust gases from the cylinders which are divided into groups so that the suction strokes of the cylinders within a given group do not overlap, and a resonance induction pipe system connecting the inlet means in each cylinder to the delivery side of the supercharger so as to create conditions of dynamic charging in the induction pipe system to supplement the action of the supercharger.

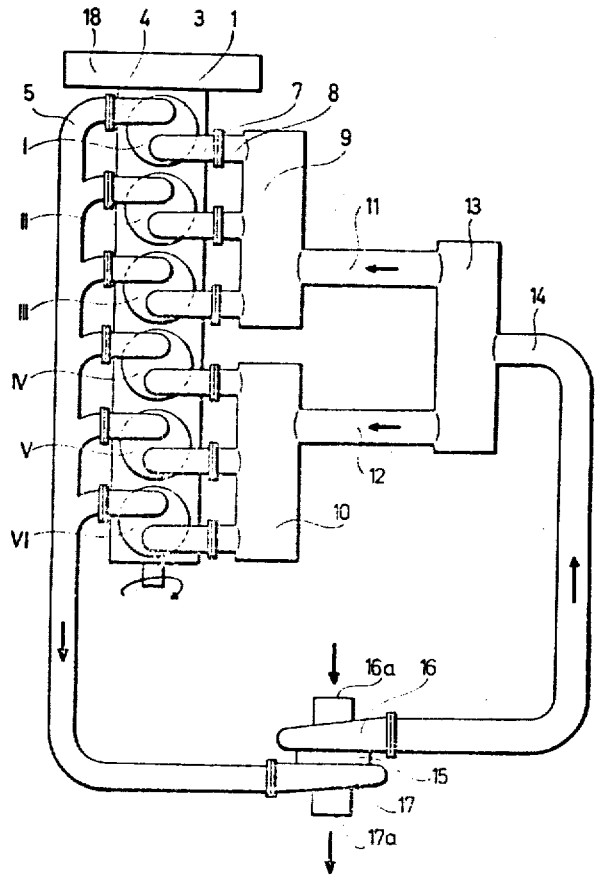

B1 3,796,048

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 4 are disclaimed.

Claim 2 having been finally determined to be unpatentable, is cancelled.

Claim 3 is determined to be patentable as amended:

3. An engine as claimed in claim [2] the capacity of said vessel being greater than one-half but less than 10 times the capacity of a said working chamber and the length of said resonance pipe being greater than 8 times the diameter of a circle having the same cross sectional area as the interior of said resonance pipe between said vessel and said receiver.

New claim 5 is added and determined to be patentable.

5. *A supercharged internal combustion engine comprising a plurality of working chambers having at least one group of at least one working chamber and at most four working chambers per group, at least one exhaust-turbo supercharger connected to receive and be driven in use by the exhaust gases from said working chambers, means for controlling the operating sequence of the said chambers to time the suction strokes to the said chambers within a multichamber group to take place without substantial overlap, inlet means in each said chamber, and a resonance induction pipe system connecting the said inlet means to the delivery side of said supercharger, said pipe system comprising a receiver between said supercharger and said inlet means, a resonance vessel between said receiver and said inlet means, a resonance pipe between said vessel and said receiver, and a pipe between said inlet means and said vessel, said pipe having a length in meters no greater than 1,500 divided by the rated r.p.m. of the engine.*

* * * * *